US012672191B2

(12) United States Patent
Yao et al.

(10) Patent No.: US 12,672,191 B2
(45) Date of Patent: Jun. 30, 2026

(54) BEAM FORM RECOVERY PROCEDURES USING UNIFIED TRANSMISSION CONFIGURATION INDICATOR STATES

(71) Applicant: ZTE CORPORATION, Shenzhen (CN)

(72) Inventors: Ke Yao, Shenzhen (CN); Bo Gao, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 311 days.

(21) Appl. No.: 18/532,651

(22) Filed: Dec. 7, 2023

(65) Prior Publication Data

US 2024/0114579 A1 Apr. 4, 2024

Related U.S. Application Data

(63) Continuation of application No. PCT/CN2021/129995, filed on Nov. 11, 2021.

(51) Int. Cl.
| | |
|---|---|
| *H04W 76/19* | (2018.01) |
| *H04B 7/06* | (2006.01) |
| *H04W 72/12* | (2023.01) |
| *H04W 72/232* | (2023.01) |
| *H04W 76/20* | (2018.01) |

(52) U.S. Cl.
CPC ........ *H04W 76/19* (2018.02); *H04B 7/06968* (2023.05); *H04W 72/12* (2013.01); *H04W 72/232* (2023.01); *H04W 76/20* (2018.02)

(58) Field of Classification Search
CPC ... H04W 76/19; H04W 72/12; H04W 72/232; H04W 76/20; H04B 7/06968; H04B 7/06964
See application file for complete search history.

(56) References Cited

U.S. PATENT DOCUMENTS

| | | |
|---|---|---|
| 10,813,157 B1 | 10/2020 | Bai et al. |
| 2021/0212082 A1 | 7/2021 | Wang et al. |
| 2021/0226688 A1 | 7/2021 | Khoshnevisan et al. |
| 2022/0279366 A1* | 9/2022 | Matsumura ........... H04W 24/08 |
| 2025/0007679 A1* | 1/2025 | Matsumura ........... H04L 5/0096 |

FOREIGN PATENT DOCUMENTS

| | | |
|---|---|---|
| CN | 113544980 A | 10/2021 |
| WO | WO-2020/223649 A1 | 11/2020 |

OTHER PUBLICATIONS

Extended European Search Report for EP Appl. No. 21963582.8, dated May 14, 2024 (8 pages).

(Continued)

*Primary Examiner* — Nizam U Ahmed
(74) *Attorney, Agent, or Firm* — Foley & Lardner LLP

(57) ABSTRACT

Presented are systems, methods, apparatuses, or computer-readable media for determining time durations for applying new beams. A wireless communication device may determine a new beam for link recovery. The wireless communication device may determine a time duration for which the new beam is applicable for performing a communication.

19 Claims, 3 Drawing Sheets

(56)  References Cited

OTHER PUBLICATIONS

Ericsson, "Remaining issues on multi-beam enhancements"; 3GPP TSG-RAN WG1 Meeting #106bis-e Tdoc R1-2109110, Oct. 11-19, 2021, e-Meeting, (23 pages).

FGI and Asia Pacific Telecom, "Discussion of enhancements on multi-beam operation", 3GPP TSG RAN WG1 #106bis-e, R1-2109832, e-Meeting, Oct. 11, 2021 (8 pages).

International Search Report and Written Opinion for PCT Appl. No. PCT/CN2021/129995 mailed Jul. 29, 2022 (with English translation, 12 pages).

Moderator (Samsung), "Moderator summary for multi-beam enhancement"; 3GPP TSG RAN WG1 #104-E R1-2101185, Jan. 25-Feb. 5, 2021, e-Meeting, (37 pages).

Nokia, et al., "Enhancements on Multi-beam Operation", 3GPP TSG RAN WG1 #105-e, R1-2105273, e-Meeting, May 10, 2021 (44 pages).

NTT Docomo, Inc, "Discussion on multi-beam operation", 3GPP TSG RAN WG1 #106bis-e, R1-2109658, e-Meeting, Oct. 11, 2021 (15 pages).

Samsung, "Summary of offline discussion on unified TCI and inter-cell beam management", 3GPP TSG RAN WG1 #106bis-e, R1-2109467, e-Meeting, Oct. 11, 2021 (26 pages).

ZTE, "Further details on Multi-beam and Multi-TRP operation", 3GPP TSG RAN WG1 Meeting #106bis-e, R1-2108877, e-Meeting, Oct. 11, 2021 (16 pages).

* cited by examiner

BEAM FORM RECOVERY PROCEDURES USING UNIFIED TRANSMISSION CONFIGURATION INDICATOR STATES

CROSS-REFERENCE TO RELATED APPLICATION

This application claims the benefit of priority under 35 U.S.C. § 120 as a continuation of International Patent Application No. PCT/CN2021/129995, filed on Nov. 11, 2021, the disclosure of which is incorporated herein by reference in its entirety.

TECHNICAL FIELD

The disclosure relates generally to wireless communications, including but not limited to systems and methods for performing beam form recovery (BFR) using unified transmission configuration indicator (TCI) states.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for determining time durations for applying new beams. A wireless communication device may determine a new beam for link recovery. The wireless communication device may determine a time for which the new beam is applicable for performing a communication.

In some embodiments, the communication may include a beam failure recovery (BFR) physical downlink control channel (PDCCH) (BFR-PDCCH), a PDCCH other than the BFR-PDCCH, a physical downlink shared channel (PDSCH), a physical uplink control channel (PUCCH), a physical uplink shared channel (PUSCH), a channel state information reference signal (CSI-RS) or a sounding reference signal (SRS).

In some embodiments, the communication may include a downlink communication which is provided a reference signal for quasi col-location (QCL) information for a demodulation reference signal (DM-RS) of a physical downlink shared channel (PDSCH) and a DM-RS of a physical downlink control channel (PDCCH), or a channel state information reference signal (CSI-RS), according to a transmission configuration indicator (TCI) state. In some embodiments, the communication may include an uplink communication which is provided a reference signal for determining an uplink (UL) transmission (TX) spatial filter for dynamic-grant and configured-grant based physical uplink shared channel (PUSCH), or a sounding reference signal (SRS), by according to a the TCI state.

In some embodiments, the new beam is applicable for performing the communication if at least one of following conditions is met: a source reference signal (RS) of the new beam is a synchronization signal block (SSB), the source RS of the new beam is not included in a beam state set activated via medium access control control element (MAC CE) signaling, or the source RS of the new beam is not included in a beam state set configured via radio resource control (RRC) signaling.

In some embodiments, the wireless communication device may determine an ending time of the time based on a signaling indicating a transmission configuration indicator (TCI) state. In some embodiments, the signaling may include at least one of: a medium access control control element (MAC CE) activating one TCI state or one codepoint of at least one TCI state; a MAC CE activating more than one TCI state, or more than one codepoint of at least one TCI state; or a downlink control information (DCI) of format 1_1 or 1_2.

In some embodiments, the wireless communication device may monitor a beam failure recovery physical downlink control channel (BFR-PDCCH) until reception of a medium access control control element (MAC CE) activating one transmission configuration indicator (TCI) state, or a codepoint of at least one TCI state. In some embodiments, the wireless communication device may monitor the BFR-PDCCH until reception of a MAC CE activating more than one TCI state or more than one codepoint of at least one TCI state, and a downlink control information (DCI) of format 1_1 or 1_2.

In some embodiments, the wireless communication device may determine a starting time of the time as X symbols after a beam failure recovery (BFR) response, wherein X is an integer value. In some embodiments, the BFR response may be determined according to one of: a physical downlink control channel (PDCCH) reception with a downlink control information (DCI) format with a cyclic redundancy check (CRC) scrambled by a cell radio network temporary identifier (C-RNTI) or modulation and coding scheme C-RNTI (MCS-C-RNTI) in a search space set provided by recoverySearchSpaceId; a PDCCH reception that determines completion of the contention based random access procedure; or a PDCCH reception with a DCI format scheduling a physical uplink shared channel (PUSCH) transmission with a same hybrid automatic request (HARD) process number as for transmission of a first PUSCH and having a toggled new data indicator (NDI) field value, wherein the first PUSCH carries a BFR medium access control control element (MAC CE).

In some embodiments, X may be determined according to one of: a smallest subcarrier spacing (SCS) of a group of component carriers (CCs) to which the new beam applies; or a smallest SCS of a group of CCs to which the new beam applies and a CC where the BFR response is received.

In some embodiments, the wireless communication device may determine, based on the new beam, a reference signal for a physical downlink shared channel (PDSCH) or a physical uplink shared channel (PUSCH) corresponding to reception of downlink control information (DCI) during the time period for which the new beam is applicable for performing the communication.

In some embodiments, the reference signal for the PDSCH or the PUSCH may be used to determine: a reference signal or quasi co-location (QCL) information for a demodulation reference signal (DMRS) of the PDSCH; or a reference signal for determining an uplink (UL) transmission (TX) spatial filter of the PUSCH.

In some embodiments, the wireless communication device may transmit an uplink signal with a power determined according to at least one power control parameter associated with the new beam. In some embodiments, the uplink signal may include at least one of: a physical uplink shared channel (PUSCH), a physical uplink control channel (PUCCH), or a sounding reference signal (SRS).

In some embodiments, the at least one power control parameter may include at least one of: an open-loop power control parameter, a pathloss reference signal (PL-RS), or a closed-loop power control parameter. In some embodiments, the at least one power control parameter may include a power control parameter associated with a TCI state of: a source reference signal of the new beam, or the new beam.

At least one aspect is directed to a system, a method, an apparatus, or a computer-readable medium for determining time durations for applying new beams. A wireless communication node may receive, from a wireless communication device, a beam failure recovery (BFR) request according to a new beam. A BFR response may be detected by the wireless communication device. After a time period of the BFR response, the new beam may be applicable for performing at least one target transmission.

At least one aspect is directed to a system, a method, an apparatus, or a computer-readable medium for power control using transmission configuration indicator (TCI) states. A wireless communication device may receive, from a wireless communication node via a signaling indicating a transmission configuration indicator (TCI) state. The TCI state may be associated with at least one power control parameter. The wireless communication device may receive, from the wireless communication node, a second DCI scheduling an uplink signal, wherein information about a power control parameter indication field in the second DCI is determined by a number of open-loop power control parameters corresponding to the TCI state.

In some embodiments, the information may include a bitsize of the power control parameter indication field in the second DCI, the bitsize determined as $\lceil \log_2(N_{OLPC}) \rceil$, where $N_{OLPC}$ is the number of open-loop power control parameters corresponding to the TCI state.

In some embodiments, the number of open-loop power control parameters corresponding to the TCI state may include at least one of: (i) a number of the at least one open-loop power control parameter associated with the TCI state; (ii) a maximum number of open-loop power control parameters associated with a TCI state within a configured set of TCI states; or (iii) a maximum number of open-loop power control parameter associated with a TCI state within an activated set of TCI states.

In some embodiments, the power control parameter indication field may indicate both open loop power control parameter, and closed loop power control parameter. In some embodiments, the wireless communication device may determine a power control parameter for an uplink signal according to at least one of: the power control parameter indication field in the second DCI or the TCI state.

At least one aspect is directed to a system, a method, an apparatus, or a computer-readable medium for determining spatial configuration using transmission configuration indicator (TCI) states. A wireless communication device may receive, from a wireless communication node via a signaling indicating a transmission configuration indicator (TCI) state. The wireless communication device may determine a configuration for a physical uplink shared channel (PUSCH) transmission based on a sounding reference signal (SRS) resource when the TCI state is applicable.

In some embodiments, the configuration may include a precoder or an uplink transmission spatial filter for the PUSCH. In some embodiments, the wireless communication device may determine an uplink transmission spatial filter for a sounding reference signal (SRS) resource with the TCI state as a reference when the TCI state is applicable.

At least one aspect is directed to a system, a method, an apparatus, or a computer-readable medium for determining associations between scheduling requests (SRs) for beam failure recoveries. A wireless communication device may determine an association between N scheduling request (SR) configurations and N sets of beam failure detecting reference signals (RSs) of a first serving cell, based on at least one of: whether the first serving cell belongs to a second serving cell, or a number of detected beam failures for the second serving cell. N may be an integer value, and the second serving cell may include at least one of: a special cell (SpCell), a serving cell of a SR configuration of the N SR configurations, or a serving cell of the N SR configurations.

In some embodiments, a relationship between an index of a set of beam failure detecting RSs and an index of an associated SR for the first serving cell, may be different from a relationship between the index of the set of beam failure detecting RSs and an index of the second serving cell. In some embodiments, the wireless communication device may determine that an index of a set of beam failure detecting RSs and an index of an associated SR are same when the first serving cell belongs to the second serving cell, and that the index of the set of beam failure detecting RSs set the index of the associated SR are different when the first serving cell does not belong to the second serving cell.

In some embodiments, the wireless communication device may determine that an index of a set of beam failure detecting RSs and an index of an associated SR are different when the first serving cell belongs to the second serving cell, and that the index of the set of beam failure detecting RSs and the index of the associated SR are same when the first serving cell does not belong to the second serving cell. In some embodiments, when the second serving cell and the first serving cell are different serving cells, the wireless communication device may determine the association between the N SR configurations and the N sets of beam failure detecting RSs of the first serving cell, if no beam failure is detected for the second serving cell.

In some embodiments, if a number of detected beam failures for the second serving cell is smaller than a number of sets of beam failure detecting RSs or candidate sets of RSs configured on the second serving cell, the wireless communication device may select a SR configuration from the N SR configurations. The selected SR configuration may be associated with a set of beam failure detecting RSs of a beam failure on the second serving cell. In some embodiments, if no beam failure is detected on the second serving cell, the wireless communication device may select a SR configuration from the N SR configurations. The selected SR configuration may be associated with a set of beam failure detecting RSs of a detected beam failure on a secondary cell (SCell).

In some embodiments, if no beam failure is detected on the second serving cell, the wireless communication device may select a SR configuration from the N SR configurations. The selected SR configuration may be associated with a plurality of SCells for which beam failure is detected in each of the SCells based on a set of beam failure detecting RSs associated with the selected SR configuration. In some embodiments, the N sets of beam failure detecting RSs sets may be of a serving cell. In some embodiments, the N sets of beam failure detecting RSs may be of one bandwidth part (BWP) of a serving cell.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
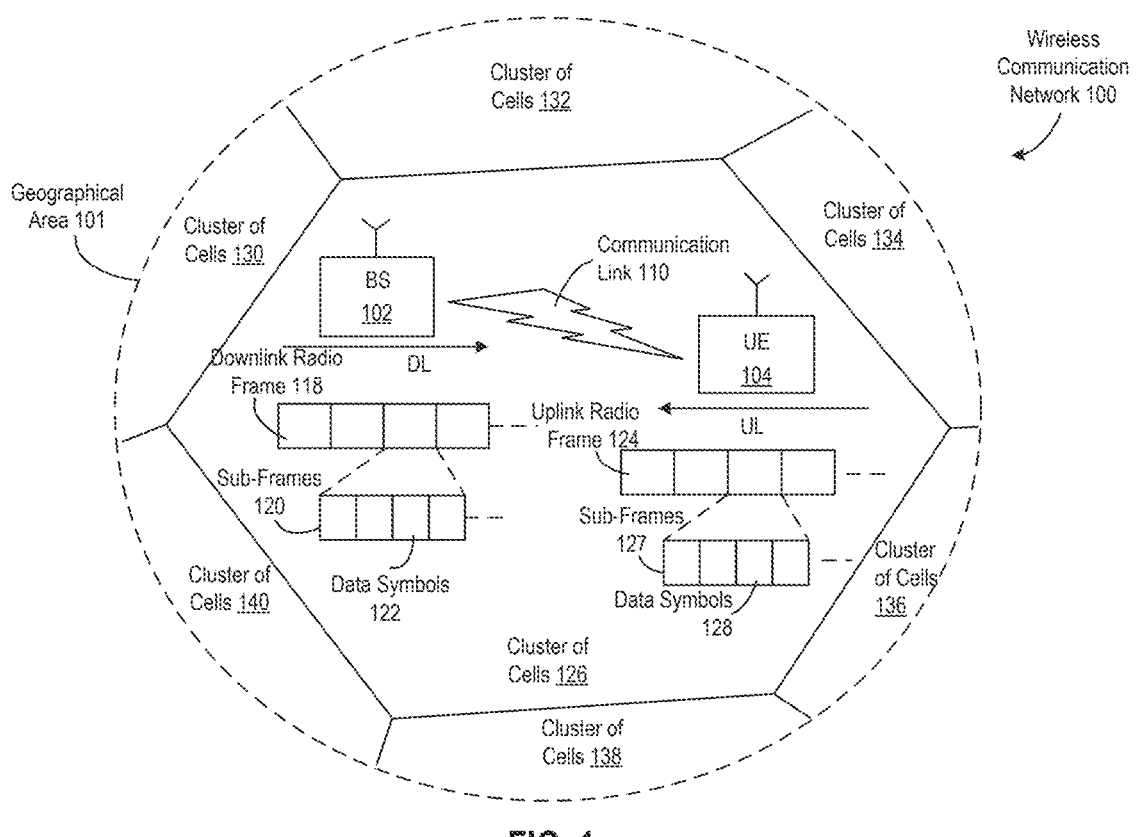
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
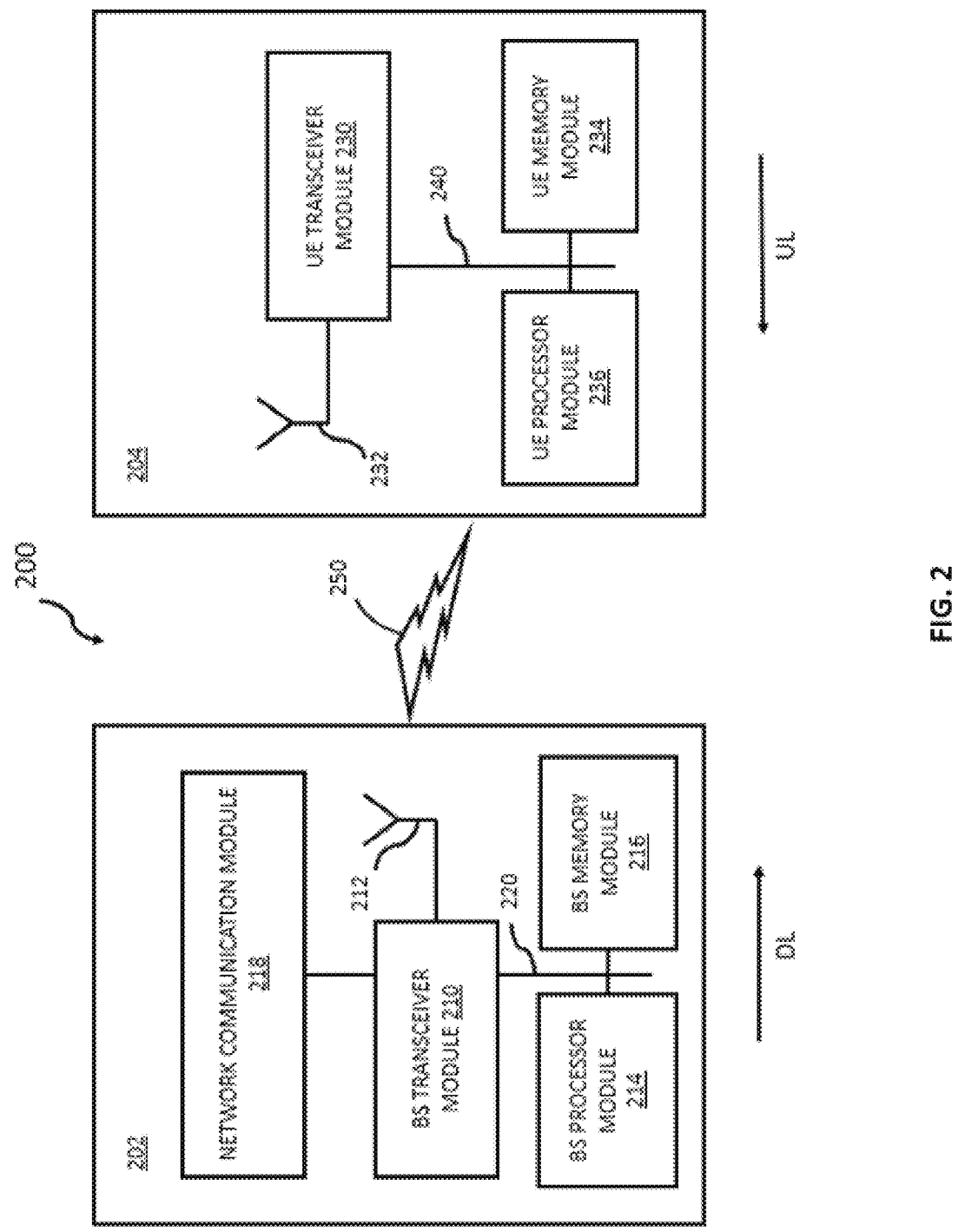
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Performing Beam Form Recovery (BFR) Using Uniformed Transmission Configuration Indicator (TCI) States The new radio (NR) technology of fifth generation (5G) mobile communication systems may include support of high frequency bands. High frequency bands may have abundant frequency domain resources, but wireless signals in high frequency bands may decay quickly and coverage of the wireless signals may become small. Thus, transmitting signals in a beam mode can concentrate energy in a relatively small spatial range and improve the coverage of the wireless signals in the high frequency bands. In unified transmission configuration indicator (TCI) framework, multiple approaches to beam form recovery (BFR) may not work well.

A. Context for Beam Failure Recover (BFR) in Monitoring Reference Signal (RS) Sets Under the beam failure recovery (BFR) scheme, a UE may monitor a set of RSs (noted as q0 configured by network or decided by the UE when not configured), transmit a BFR request according to a new beam (noted as q new), if all of RSs fail (the corresponding radio link quality lower than a threshold), a time period after detecting a BFR response the new beam may be applicable for a physical downlink control channel (PDCCH) monitoring in a control resource set (CORESET) 0, and a physical uplink control channel (PUCCH).

The unified transmission configuration indicator (TCI) scheme may aim to unify beams for at least one target transmission. A TCI state may be indicated by a downlink control information (DCI) or a media access control control element (MAC CE). With the indication, when the TCI state becomes applicable, the TCI state can be applied for all target transmissions. The target transmission may comprise at least one of a physical downlink shared channel (PDSCH), physical uplink shared channel (PUSCH), a physical downlink control channel (PDCCH), a physical uplink control channel (PUCCH), a channel state information reference signal (CSI-RS), or a sounding reference signal (SRS), among others. In unified TCI framework, various approaches of the BFR scheme may not work well, as there may be multiple issues.

First, when a new beam (noted as q new) becomes applicable, the new beam may be used for monitoring control resource set (CORESET) BFR or search space (SS) BFR. The monitoring may be performed until at least one new TCI state is configured by a radio resource control (RRC) signaling or activated by a MAC CE from the network, not considering the case that the new TCI state is indicated by the DCI as the unified TCI state.

Second, when a new beam (noted as q new) becomes applicable, the new beam can be applied to PDCCH monitoring and PUCCH transmission under the specification of the scheme. The beam for other types of transmissions may be undetermined until determined in accordance with the scheme, which may consume a long time.

Third, when a new beam (noted as q new) becomes applicable, power control parameters for uplink transmission (e.g., PUCCH) may be determined by $q_u=0$ (for open-loop power control parameter P0), $q_d=q_{new}$, (for pathloss RS) and l=0 (for closed-loop power control), which may not reflect the property of the new beam:

$$P_{PUCCH,b,f,c}(i, q_u, q_d, l) =$$
$$\min\begin{Bmatrix} P_{CMAX,f,c}(i), \\ P_{0\_PUCCH,b,f,c}(q_u) + 10\log_{10}(2^\mu \cdot M_{RB,b,f,c}^{PUCCH})(i)) + \\ PL_{b,f,c}(q_d) + \Delta_{F\_PUCCH}(F) + \Delta_{TF,b,f,c}(i) + g_{b,f,c}(i, l) \end{Bmatrix} [dBm]$$

For the first issue, ending time of monitoring may consider the case that a unified TCI state is indicated by a DCI. For the second issue, target transmission type(s) of the new beam can be enhanced. For example, the target transmission types can be same as target transmission type for unified TCI state. In addition, the target transmission type for the unified TCI state may be determined by a configured enable-flag for each type, or if a PDCCH, PDSCH, PUCCH, PUSCH, or SRS is not configured with a TCI state. For the third issue, power control parameters for open-loop and closed-loop may be determined by the new beam, especially when the new beam is a CSI-RS configured with a TCI state and the TCI state is associated with a set of power control parameters for PUSCH, PUCCH, or SRS.

B. Details Regarding Beam Form Recovery Scheme

A UE can be provided, for each bandwidth part (BWP) of a serving cell, a set $\bar{q}_0$ of periodic CSI-RS resource configuration indexes by failureDetectionResourcesToAddModList and a set $\bar{q}_1$ of periodic CSI-RS resource configuration indexes and/or SS/PBCH block indexes by candidateBeamRSList or candidateBeamRSListExt or candidateBeamRSSCellList for radio link quality measurements on the BWP of the serving cell. If the UE is not provided $\bar{q}_0$ by failureDetectionResourcesToAddModList for a BWP of the serving cell, the UE may determine the set $\bar{q}_0$ to include periodic CSI-RS resource configuration indexes with same values as the RS indexes in the RS sets indicated by TCI-State for respective CORESETs that the UE uses for monitoring PDCCH. If there are two RS indexes in a TCI state, the set $\bar{q}_0$ may include RS indexes configured with qcl-Type set to 'typeD' for the corresponding TCI states.

The physical layer in the UE may assess the radio link quality according to the set $\bar{q}_0$ of resource configurations against the threshold $Q_{out,LR}$. The physical layer in the UE may provide an indication to higher layers when the radio link quality for all corresponding resource configurations in the set $\bar{q}_0$ that the UE uses to assess the radio link quality is worse than the threshold $Q_{out,LR}$. The physical layer may inform the higher layers when the radio link quality is worse than the threshold $Q_{out,LR}$ with a periodicity.

For the primary cell (PCell) or the primary and secondary cells (PSCell), upon request from higher layers, the UE may provide to higher layers the periodic CSI-RS configuration indexes or synchronization signal (SS) or physical broadcast channel (PBCH) block indexes from the set $\bar{q}_1$ and the corresponding layer-1 reference signal received power (L1-RSRP) measurements that are larger than or equal to the $Q_{in,LR}$ threshold.

For the secondary cell (SCell), upon request from higher layers, the UE may indicate to higher layers whether there is at least one periodic CSI-RS configuration index or SS/PBCH block index from the set $\bar{q}_1$ with corresponding L1-RSRP measurements that are larger than or equal to the $Q_{in,LR}$ threshold. The UE may provide the periodic CSI-RS configuration indexes or SS/PBCH block indexes from the set $\bar{q}_1$ and the corresponding L1-RSRP measurements that are larger than or equal to the $Q_{in,LR}$ threshold, if any.

For the PCell or the PSCell, the UE can be provided a CORESET through a link to a search space set provided by recoverySearchSpaceId for monitoring PDCCH in the CORESET. If the UE is provided recoverySearchSpaceId, the UE may not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for physical random access channel (PRACH) transmission. For PRACH transmission in slot n and according to antenna port quasi co-location parameters associated with periodic CSI-RS resource configuration or with SS/PBCH block associated with index $q_{new}$ provided by higher layers, the UE monitors PDCCH in a search space set provided by recoverySearchSpaceId for detection of a DCI format with CRC scrambled by C-RNTI or MCS-C-RNTI starting from slot n+4 within a window configured by BeamFailureRecovery-Config For PDCCH monitoring in a search space set provided by recoverySearchSpaceId and for corresponding PDSCH reception, the UE may assume the same antenna port quasi-collocation parameters as the parameters associated with index $q_{new}$ until the UE receives by higher layers an activation for a TCI state or any of the parameters tci-StatesPDCCH-ToAddList and/or tci-StatesPDCCH-ToReleaseList After the UE detects a DCI format with a cyclic redundancy check (CRC) scrambled by cell radio network temporary identifier (C-RNTI) or a modulation and coding scheme (MCS-C-RNTI) in the search space set provided by recoverySearchSpaceId, the UE may continue to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

For the PCell or the PSCell, after 28 symbols from a last symbol of a first PDCCH reception in a search space set provided by recoverySearchSpaceId, the UE may detect a DCI format with CRC scrambled by C-RNTI or MC S-C-RNTI. Until receipt of an activation command for PUCCH-SpatialRelationInfo or provision of PUCCH-SpatialRelationInfo for PUCCH resource(s), the UE may transmit a PUCCH on a same cell as the PRACH transmission using: (i) a same spatial filter as for the last PRACH transmission; and (ii) a power determined with $q_u$=0, $q_d$=$q_{new}$, and l=0.

For the PCell or the PSCell, after 28 symbols from a last symbol of a first PDCCH reception in a search space set provided by recoverySearchSpaceId, a UE may detect a DCI format with CRC scrambled by C-RNTI or MCS-C-RNTI. In response, the UE may assume same antenna port quasi-collocation parameters as the ones associated with index $q_{new}$ for PDCCH monitoring in a CORESET with index 0.

For the PCell or the PSCell, if BFR MAC CE is transmitted in a message 3 (Msg3) or MsgA (a message used in 2-step random access channel (RACH)) of contention based random access procedure, and if a PUCCH resource is provided with PUCCH-SpatialRelationInfo, after 28 symbols from the last symbol of the PDCCH reception that determines the completion of the contention based random access procedure, the UE may transmit the PUCCH on a same cell as the PRACH transmission using: (i) a same spatial filter as for the last PRACH transmission; and (ii) a power determined with $q_u$=0, $q_d$=$q_{new}$, and l=0, where $q_{new}$ is the SS/PBCH block index selected for the last PRACH transmission.

A UE can be provided, by schedulingRequestID-BFR-SCell, a configuration for PUCCH transmission with a link recovery request (LRR). The UE can transmit in a first PUSCH MAC CE providing one or more indexes for at least corresponding one or more SCells with radio link quality worse than $Q_{out,LR}$, indication(s) of presence of $q_{new}$ for corresponding SCells, and indexes $q_{new}$ for a periodic CSI-RS configuration or for a SS/PBCH block provided by higher layers, if any, for corresponding SCells. After 28 symbols from a last symbol of a PDCCH reception with a DCI format scheduling a PUSCH transmission with a same hybrid automated repeated request (HARD) process number as for the transmission of the first PUSCH and having a toggled new data indicator (NDI) field value, the UE may monitor PDCCH in all CORESETs on the SCell(s) indicated by the MAC CE using the same antenna port quasi co-location parameters as the ones associated with the corresponding index(es) $q_{new}$, if any.

The UE may transmit PUCCH on a PUCCH-SCell using a same spatial domain filter as the one corresponding to $q_{new}$, if any. The UE may also transmit for periodic CSI-RS or SS/PBCH block reception, and using a power determined with $q_u$=0, $q_d$=$q_{new}$, and l=0, if the UE is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC-CE. The subcarrier spacing (SCS) configuration for the 28 symbols may be the smallest of the SCS configurations of the active downlink (DL) BWP for the PDCCH reception and of the active DL BWPs of the at least one SCell C. Ending Time for Consideration of Downlink Control Information (DCI) Indicating Transmission Configuration Indicator (TCI) States During beam failure recovery (BFR) procedure, the ending time of monitoring PDCCH in the search space set provided by recoverySearchSpaceId or a corresponding PDSCH reception may be determined according to a DCI which indicates a transmission configuration indictor (TCI) state or a MAC CE which activates the TCI state. The ending time may be used for the reception of other types of downlink (DL) signals and transmission of other types of uplink (UP) signals.

In some embodiments, for PDCCH monitoring in a search space set provided by recoverySearchSpaceId and for corresponding PDSCH reception, the UE may assume the same antenna port quasi-colocation parameters as the parameters associated with index $q_{new}$ until the UE receives, via higher layers an activation for a TCI state, any of the parameters tci-StatesPDCCH-ToAddList and/or tci-StatesPDCCH-ToReleaseList, or (e.g. when function 1 or function 2 is enabled), a DCI which indicates a (codepoint of) TCI state after (or after an application time of) a MAC CE which activates more than one (codepoint of) TCI state, or a MAC CE which activates one (codepoint of) TCI state.

In some embodiments, after the UE detects a DCI format with CRC scrambled by C-RNTI or MCS-C-RNTI in the search space set provided by recoverySearchSpaceId, the UE may continue to monitor PDCCH candidates in the search space set provided by recoverySearchSpaceId until the UE receives a MAC CE activation command for a TCI state, tci-StatesPDCCH-ToAddList or (e.g., when function 1 (TCI scheme) or function 2 (enhanced BFR scheme) is enabled) a DCI which indicates a (codepoint of) TCI state after (or after an application time of) a MAC CE which activates more than one (codepoint of) TCI state, or a MAC CE which activates one (codepoint of) TCI state.

In some embodiments, the UE may perform PDCCH monitoring in the search space set provided by recoverySearchSpaceId and corresponding PDSCH reception, assuming the same antenna port quasi-colocation parameters as the ones associated with index $q_{new}$, until the UE receives a MAC CE activation command for a TCI state, tci-StatesPDCCH-ToAddList or tci-StatesPDCCH-ToReleaseList, or (e.g. when function 1 (TCI scheme) or function 2 (enhanced BFR scheme) is enabled) a DCI which indicates a (codepoint of) TCI state after (or after an application time of) a MAC CE which activates more than one (codepoint of) TCI state, or a MAC CE which activates one (codepoint of) TCI state.

For the PCell or the PSCell, after 28 symbols from a last symbol of a first PDCCH reception in a search space set provided by recoverySearchSpaceId, the UE may detect a DCI format with CRC scrambled by C-RNTI or MCS-C-RNTI. Until receipt of an activation command for PUCCH-SpatialRelationInfo or provision of PUCCH-SpatialRelationInfo for PUCCH resources or a beam state applied for PUCCH, the UE may transmit a PUCCH on a same cell as the PRACH transmission using: (i) a same spatial filter as for the last PRACH transmission and (ii) a power determined with $q_u$=0, $q_d$=$q_{new}$, and l=0.

D. New Beam to Apply More Types of Channels and Signals

After receiving a beam failure recovery response (BFRR), a CORESET-BFR may be assumed to be quasi-co-located (QCLed) with the new beam. Before TCI states are reconfigured by the network, the new beam may be the best choice for reception of DL channels (e.g. PDCCH with CORESET 0) and for transmissions of uplink (UL) channels (e.g., PUCCH).

Under the unified TCI framework, it may be assumed that all DL channels and signals can use a unified beam state, and all UL channels and signals can use a unified beam state. When joint DL and UL beam state is enabled or provided, the unified beam state for DL may be the same as for UL. When separate DL and UL beam state is enabled or provided, the unified beam state for DL may be independent from that for UL. Therefore, enhancement can be considered for BFR in unified TCI framework. X symbols after the UE receives the BFRR, the new beam may apply to at least one target signal (e.g., besides PUCCH corresponding to CORESET-BFR and the corresponding PDSCH).

The target signal may be enhanced. Target transmission types of the new beam can be enhanced, such as the same as target transmission type for unified TCI state some of the target transmission types for unified TCI state determined by a configured enable-flag for each type. The target transmission type can include a PDCCH, PDSCH, PUCCH. PUSCH, or SRS not configured with a TCI state. The new beam can be applied to at least one of the following target signals: PDCCH, PDSCH, CSI-RS, PUCCH, PUSCH or SRS.

The new beam can be applied to the at least one target signals according to one of the following rules. The target signals may be same as target signal type for unified TCI state. The target signals may include the DL channels or signals that share the same indicated TCI state as UE-dedicated reception on PDSCH or PDCCH. The target signals may include the UL channels or signals that share the same indicated TCI state as UE-dedicated transmission on PUSCH or PUCCH. The target signals may include the UL channels or signals that share the same indicated TCI state as UE-dedicated transmission on PUSCH or PUCCH.

In addition, the target signals may include the target signal type for unified TCI state determined by a configured enable-flag for each type (e.g., configured by a flag which is enabled, a switch which is configured as on, or a configuration when provided (disable parameter) or not provided (enable parameter)). The target signals may also be not configured with TCI state. For example, when the target signal is not configured with a TCI state, the target signal may be assumed to use the new beam to perform the target signal.

The new beam may be applicable when a source reference signal (RS) (also called reference RS or reference signal) of the new beam is a synchronization signal block (SSB). The new beam may be applicable when source RS is not included in an activated TCI state set (e.g., via MAC CE). The new beam may be applicable when the source RS is not included in a TCI state list (e.g., configured via RRC signaling).

X symbols may also be enhanced. X symbols can be determined according to at least one of: (i) SCS of a PCell or PScell; (ii) SCS of a component carrier (CC) where BFR is triggered; (iii) a smallest SCS of a group of CCs sharing the indicated TCI state; (iv) type of BFR (e.g. both or either of PCell-BFR or SCell-BFR); (v) a type of BWP CC (e.g., DL or UL or both). Further, the application time of the new beam for the target signals can be determined as one of: (i) first slot after X symbols or (ii) first symbol after X symbols.

E. Power Control Scheme Following New Beam

Power control parameters for open-loop and closed-loop may be determined by the new beam for the third issue mentioned above. This may be especially so when the new beam is a CSI-RS which is configured with a TCI state and the TCI state is associated with a set of power control parameters for PUSCH, PUCCH, or SRS. When a new beam is applicable, the UE may transmit an UL signal using a power determined by a power control parameter associated with the new beam.

The uplink signal may comprise at least one of PUSCH, PUCCH or SRS. The power control parameters may include at least one of open-loop power control (PC) parameter (such as target receiving power P0, coefficient of path loss alpha), PL-RS (RS for pathloss measurement), and closed-loop PC parameter (such as closed-loop power control index), among others. The power control parameter associated with the new beam may include the power control parameter associated with a TCI state which is the source RS (or a reference RS) or the new beam.

When a new beam is applicable (e.g. for the PCell or the PSCell), after 28 symbols from a last symbol of a first PDCCH reception in a search space set provided by recoverySearchSpaceId, the UE may detect a DCI format with CRC scrambled by C-RNTI or MCS-C-RNTI. Until receipt of an activation command for PUCCH-SpatialRelationInfo or provision of PUCCH-SpatialRelationInfo for PUCCH resource(s), the UE may transmit a PUCCH (e.g., on a same cell as the PRACH transmission), using a power determined by a PUCCH power control parameters associated with the new beam.

When a new beam is applicable (e.g. for the PCell or the PSCell), after 28 symbols from a last symbol of a first PDCCH reception in a search space set provided by recoverySearchSpaceId, the UE may detect a DCI format with CRC scrambled by C-RNTI or MCS-C-RNTI. The UE may transmit a PUSCH (e.g., on a same cell as the PRACH transmission), using a power determined by a PUSCH power control parameters associated with the new beam.

When a new beam is applicable (e.g. for the PCell or the PSCell), after 28 symbols from a last symbol of a first PDCCH reception in a search space set provided by recoverySearchSpaceId, the UE may detect a DCI format with CRC scrambled by C-RNTI or MCS-C-RNTI. The UE may transmit a SRS (e.g. on a same cell as the PRACH transmission), using a power determined by a SRS power control parameters associated with the new beam.

The UE can transmit in a first PUSCH MAC CE providing one or more indexes for at least corresponding SCells with radio link quality worse than $Q_{out,LR}$, indications of presence of $q_{new}$ for corresponding SCells, and indexes $q_{new}$ for a periodic CSI-RS configuration or for a SS/PBCH block provided by higher layers, if any, for corresponding SCells. After 28 symbols from a last symbol of a PDCCH reception with a DCI format scheduling a PUSCH transmission with a same HARQ process number as for the transmission of the first PUSCH and having a toggled NDI field value, the UE can transmit PUCCH on a PUCCH-SCell using a same spatial domain filter as the one corresponding to $q_{new}$, if any, for periodic CSI-RS or SS/PBCH block reception using a power determined by a PUCCH power control parameters associated with the new beam. The UE can transmit under a number of conditions, such as if: (i) the UE is provided PUCCH-SpatialRelationInfo for the PUCCH, (ii) a PUCCH with the LRR was either not transmitted or was transmitted on the PCell or the PSCell, or (iii) the PUCCH-SCell is included in the SCell(s) indicated by the MAC-CE.

After 28 symbols from a last symbol of a PDCCH reception with a DCI format scheduling a PUSCH transmission with a same HARQ process number as for the transmission of the first PUSCH and having a toggled NDI field value, the UE may transmit a PUSCH (e.g. on a same cell as the PRACH transmission), using a same spatial domain filter as the one corresponding to $q_{new}$, if any, for periodic CSI-RS or SS/PBCH block reception. The UE may also transmit using a power determined by a PUSCH power control parameters associated with the new beam.

After 28 symbols from a last symbol of a PDCCH reception with a DCI format scheduling a PUSCH transmission with a same HARQ process number as for the transmission of the first PUSCH and having a toggled NDI field value, the UE may transmit a SRS (e.g., on a same cell as the PRACH transmission), using a same spatial domain filter as the one corresponding to $q_{new}$, if any, for periodic CSI-RS or SS/PBCH block reception. The UE may transmit, using a power determined by a SRS power control parameters associated with the new beam. The SCS configuration for the 28 symbols may be the smallest of the SCS configurations of the active DL BWP for the PDCCH reception and of the active DL BWP(s) of the at least one SCell.

Further, PUCCH power control parameters associated with the new beam may include at least one of: (i) P0 that is determined by the parameter of P0 for PUCCH associated with the new beam; (ii) PL-RS that is determined by the parameter of PL-RS for PUCCH, PUSCH, or SRS associated with the new beam; and (iii) closed-loop power control index that is determined by the parameter of closed-loop power control index for PUCCH associated with the new beam.

In addition, PUSCH power control parameters associated with the new beam may include at least one of: (i) P0 or alpha that is determined by the parameter of P0 or alpha for PUSCH associated with the new beam; (ii) PL-RS that is determined by the parameter of PL-RS for PUCCH, PUSCH, or SRS associated with the new beam; and (iii) closed-loop power control index that is determined by the parameter of closed-loop power control index for PUSCH associated with the new beam.

Furthermore, SRS power control parameters associated with the new beam may include at least one of: (i) P0 or alpha that is determined by the parameter of P0 or alpha for SRS associated with the new beam; (ii) PL-RS that is determined by the parameter of PL-RS for PUCCH, PUSCH, or SRS associated with the new beam; and (iii)

closed-loop power control index that is determined by the parameter of closed-loop power control index for SRS associated with the new beam.

F. Power Control for Ultra-Reliable Low Latency Communication (URLLC) in the Unified Transmission Configuration Indicator (TCI) Framework The UE may be provided a TCI state associated with or including at least one power control parameter, such as an open loop power control parameter, P0 (target receive power). The TCI state may be provided to the UE by a first DCI, or a MAC CE. The uplink signal may be scheduled or activated by a second DCI.

The bitsize (or presence) of power control parameter indication field (e.g. open-loop power control parameter set indication field) in the second DCI may be determined by a number of open-loop power control parameters associated with or included in a TCI state. Further, the bitsize of power control parameter indication field in the second DCI may be determined as $[\log_2(N_{OLPC})]$, where $N_{OLPC}$ is the number of open-loop power control parameter(s) associated with (or included in) the TCI state.

The number of open-loop power control parameters associated with or included in the TCI state may include at least one of: (i) a number of open-loop power control parameters associated with or included in the indicated TCI state; (ii) a maximum number of open-loop power control parameters associated with the TCI state within a configured TCI state set (e.g., configured via RRC signaling); or (iii) a maximum number of open-loop power control parameter associated with the TCI state within an activated TCI state set (e.g. activated via MAC CE).

The configured TCI state set or the associated TCI state set may be for uplink or for both downlink and uplink (e.g., joint DL and UL). The UE may determine a power control parameter for an uplink signal according to at least one of the power control parameter indication field in the second DCI or the indicated TCI state. The DCI may have DCI format 0-1, or DCI format 0-2, or a uplink DCI format except DCI format 0-0.

In some embodiments, the UE may determine a power control parameter for the uplink signal according to the TCI state, if the number of open-loop power control parameter associated with or included in the TCI state is 1. In some embodiments, the UE may determine a power control parameter for the uplink signal according to the power control parameter indication field in the second DCI and the indicated TCI state, if the number of open-loop power control parameter associated with or included in the TCI state is larger than 1.

The power control parameter indication field may indicate both open loop power control parameter (e.g., P0) and closed loop power control parameter (e.g., closed-loop power control index). Then, the value of the power control parameter indication field may indicate a codepoint value for an open loop power control parameter and a closed loop power control parameter. An example is shown in table 1.

TABLE 1

| value of the power control parameter indication field | open loop power control parameter | closed loop power control parameter |
|---|---|---|
| 0 | P0_value 0 | 0 |
| 1 | P0_value 1 | 0 |
| 2 | P0_value 2 | 1 |
| 3 | P0_value 3 | 1 |

G. Uplink (UL) Spatial Determination for Physical Uplink Shared Channel (PUSCH) in the Unified Transmission Configuration Indicator (TCI) Framework An indicated TCI state can be used to provide a reference for determining UL TX spatial filter for an SRS resource. The TCI state can be used to provide a reference for determining UL transmission (TX) spatial filter for PUSCH directly, via SRS (e.g. the SRS resource indicated by an SRS resource indicator (SRI)) in a DCI scheduling or activating the PUSCH, or by the only SRS resource in a corresponding SRS resource set if no SRI is present in the DCI.

The PUSCH may include at least one of: (i) dynamic-grant PUSCH or (ii) configured-grant based PUSCH. An indicated TCI-State can be used to provide a reference for determining UL TX spatial filter for an SRS resource when or after the indicated TCI state is applicable. The UE may determine a PUSCH transmission precoder or determines UL TX spatial filter based on the SRS resource when or after the indicated TCI state is applicable. In other words, no matter the SRS resource with the indicated TCI state as its reference has been transmitted or not when determined for PUSCH. The SRS resource may be used for PUSCH. The beam or beam state may include a reference signal, a reference signal resource indicator, or a TCI (state).

In general, ending time of monitoring CORESET-BFR may consider the case that a unified TCI state indicated by a DCI. The target transmission type of the new beam may be enhanced, besides current type of PDCCH, PDSCH, or PUCCH (e.g. same as target transmission type for unified TCI state). The power control parameters for open-loop and closed-loop may be determined by the new beam, especially when the new beam is a CSI-RS which is configured with a TCI state, and the TCI state is associated with a set of power control parameters for PUSCH, PUCCH, or SRS.

H. Scheduling Requests (SRs) for Beam Failure Recovery

The UE may determine an association between two scheduling requests (SRs) including SR0 and SR1 and two beam failure detecting reference signal (RS) sets $q_{0,0}$, $q_{0,1}$ on one BWP according to whether the serving cell of the one BWP is a special cell (SpCell) (e.g., second serving cell) (e.g., PCell or PSCell). One SR may correspond to one PUCCH resource. Two SRs may correspond to two PUCCH resources.

When the serving cell of the one BWP is SpCell, then SR 0 may be associated with $q_{0,0}$ and SR 1 may be associated with $q_{0,1}$. When the serving cell of the one BWP is not a SpCell (e.g., SCell (secondary serving cell)), SR 0 may be associated with $q_{0,1}$ and SR 1 may be associated with $q_{0,0}$. The relationship between the index of beam failure detecting RS set and the index of the associated SR for SpCell and SCell may be different.

The index of beam failure detecting RS set and the index of the associated SR may be same for SpCell, but the index of beam failure detecting RS set and the index of the associated SR may be different for SCell. The index of beam failure detecting RS set may be an index among two (or more) beam failure detecting RS sets on one BWP. The index of SR may be index among two (or more) SRs on one BWP or on one Cell group. In some embodiments, for a SCell, the SR 0 may be associated with $q_{0,1}$ of one BWP of the SCell and SR 1 may be associated with $q_{0,0}$ of one BWP of the SCell when beam failure is detected for neither $q_{0,0}$ nor $q_{0,1}$ on SpCell. SR 0 may be associated with $q_{0,0}$ of one BWP of the SpCell and SR 1 may be associated with $q_{0,1}$ of one BWP of the SpCell when at least one beam failure is detected for $q_{0,0}$ and $q_{0,1}$ of one BWP of the SpCell. The SR 0 may be associated with $q_{0,1}$ of one BWP of the SCell and SR 1 may be associated with $q_{0,0}$ of one BWP of the SCell when beam failure is detected for neither $q_{0,0}$ nor $q_{0,1}$ on SpCell.

In some embodiments, the relationship between the index of beam failure detecting RS set index and the index of the associated SR for SpCell and SCell may be different. The index of beam failure detecting RS set index and the index of the associated SR may be different for SpCell, but the index of beam failure detecting RS set index and the index of the associated SR may be same for SCell. The SR may be associated with beam failure detecting RS set on SpCell in case that at least one beam failure is detected for $q_{0,0}$ and $q_{0,1}$ of one BWP of the SpCell. The SR may be associated with beam failure detecting RS set on SCell in case that beam failure is detected for neither $q_{0,0}$ nor $q_{0,1}$ of one BWP of the SpCell.

In some embodiments, if the UE detects beam failure based on a beam failure detecting RS set, the UE can transmit the SR associated with the beam failure detecting RS set. When the UE detects beam failure based on $q_{0,0}$ on one BWP of SpCell, the UE may transmit SR0 which is associated with $q_{0,0}$ on one BWP of SpCell. When the UE detects beam failure based on $q_{0,0}$ on one BWP of SCell, the UE may transmit SR1 which is associated with $q_{0,0}$ on one BWP of SCell.

In some embodiments, the UE may select SRs from the two SRs based on the association and at least one of: the number of beam failure on SpCell, the number of beam failure detecting RS sets or candidate RS sets configured on SpCell. If the number of beam failure is detected on SpCell is smaller than the number of beam failure detecting RS sets or candidate RS sets configured on SpCell, the UE may select SR associated with the beam failure detecting RS set of the beam failure on SpCell. If no beam failure is detect on SpCell, the UE may select SR associated with beam failure detecting RS sets of a detected beam failure on SCell. The UE may also select SR associated with more beam failure SCells. A SR may be associated with a beam failure on a SCell comprising the beam failure detected on the SCell based on a beam failure detecting RS set corresponding to the SR. If the number of beam failure is detected on SpCell is smaller than the number of beam failure detecting RS sets or candidate RS sets configured on SpCell, PRACH may be initiated.

If one beam failure is detected on SpCell, the UE may select the SR associated with the beam failure detecting RS set of the beam failure on SpCell. If no beam failure is detect on SpCell, the UE may select SR associated with beam failure detecting RS sets of a detected beam failure on SCell. The UE may also SR associated with more beam failure SCells. A SR may be associated with a beam failure on a SCell comprising the beam failure detected on the SCell based on a beam failure detecting RS set corresponding to the SR.

In some embodiments, $q_{0,0}$ on one BWP may be associated with first CORESETs of the one BWP. The first CORESETs may include CORESET configured with CORESET pool index with value 0 or CORESET without configuration of CORESET pool index. For example, when $q_{0,0}$ of the one BWP is not configured, the UE may determine the $q_{0,0}$ based on a quasi-co-location reference signal (QCL-RS) of first CORESET. After the UE successfully transmits new RS selected from candidate RS set $q_{1,0}$ to gNB, the UE may determine the QCL-RS of each CORESET in the first CORESETS follows the reported new beam. $q_{1,0}$ is associated with $q_{0,0}$. For example, when beam failure is detected based on $q_{0,0}$ of the one BWP, the UE may select a RS from candidate RS set $q_{1,0}$.

In some embodiments, $q_{0,1}$ on one BWP may be associated with first CORESETs of the one BWP. The first CORESETs may include CORESET configured with CORESET pool index with value 0 or CORESET without configuration of CORESET pool index. For example, when $q_{0,1}$ of the one BWP is not configured, the UE may determine the $q_{0,1}$ based on a QCL-RS of first CORESET. After the UE successfully transmits new RS selected from candidate RS set $q_{1,1}$ to gNB, the UE may determine that the QCL-RS of each CORESET in the first CORESETS follows the reported new beam. $q_{1,1}$ may be associated with $q_{0,1}$. For example, when beam failure is detected based on $q_{0,1}$ of the one BWP, the UE may select a RS from candidate RS set $q_{1,1}$. In some embodiments, SR0 may be transmitted to a transmission/reception point 1 (TRP1) in SpCell. SR1 may be transmitted to a transmission/reception point 0 (TRP0) in SpCell. In some embodiments, the two SRs may be on SpCell.

In some embodiments, the procedures described above may include replacing SpCell with a serving cell of the two SRs and replacing SCell with serving cells in a cell group except the serving cell of the two SRs. Then the second of serving cell may include the serving cell of the two SRs. In some embodiments, the second serving cell may include SpCell and the serving cell of the two SRs.

Figure 3:
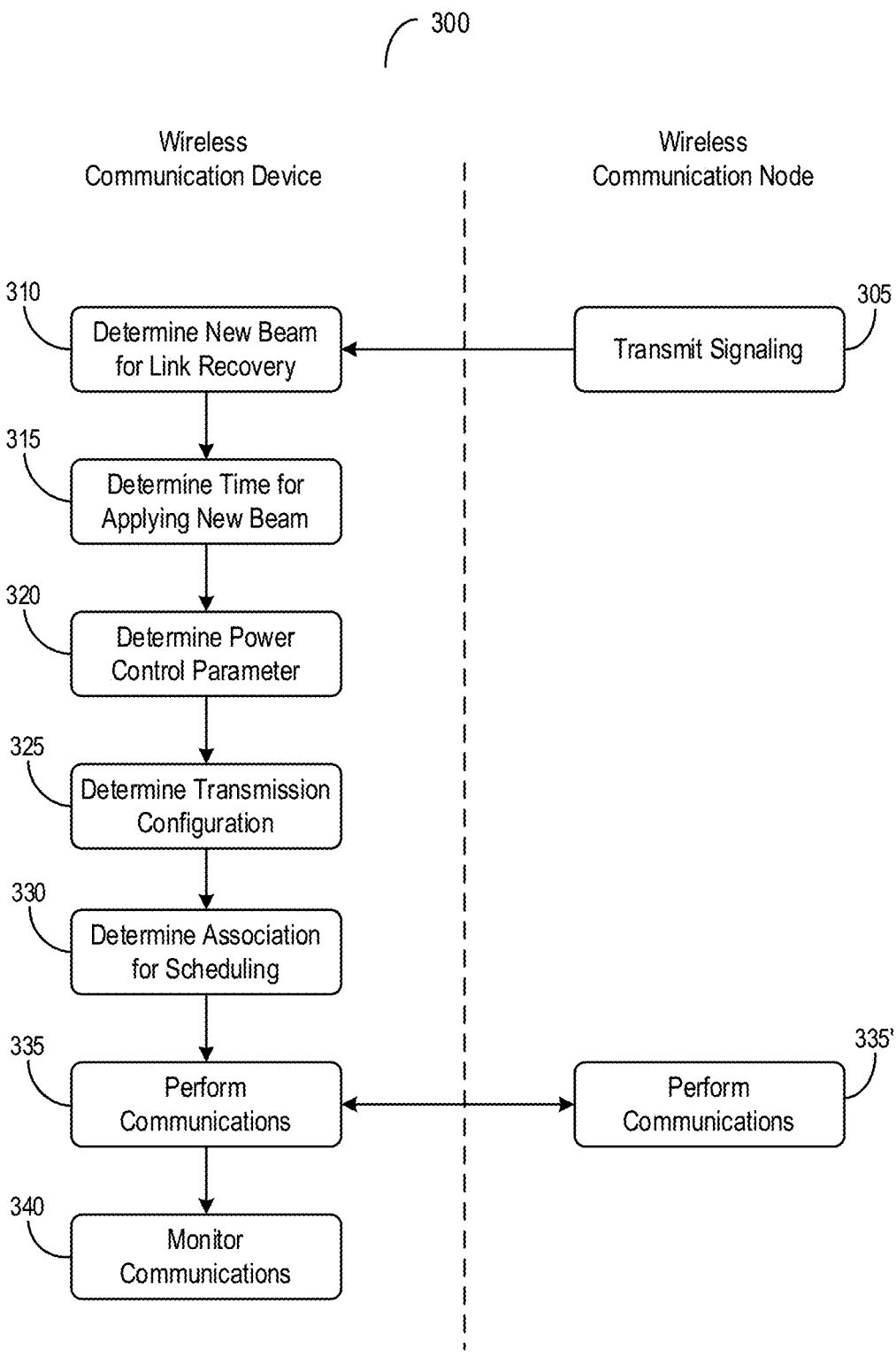
FIG. 3 illustrates a flow diagram of an example method of beam form recovery (BFR) using uniformed transmission configuration indicators (TCI) in accordance with an illustrative embodiment.

I. Process for Beam Form Recovery (BFR) Using Uniformed Transmission Configuration Indicator (TCI) States Referring now to FIG. 3, depicted is a flow diagram of a method 300 of beam form recovery (BFR) using uniformed transmission configuration indicators (TCI). The method 300 may be implemented using or performed by any of the components detailed above, such as the UE 104 or 204 and BS 102 or 202, among others. In brief overview, a wireless communication node may transmit a signaling to a wireless communication device (305). The wireless communication device may determine a new beam for link recovery (310). The wireless communication device may determine a time for application of the new beam (315). The wireless communication device may determine a power control parameter (320). The wireless communication device may determine a transmission configuration (325). The wireless communication device may determine association for scheduling (330). The wireless communication device may perform communications with the wireless communication node (335 and 335'). The wireless communication device may monitor the communications (340).

In further detail, a wireless communication node (e.g., BS 102 or 202) may provide, send, or otherwise transmit a signaling to a wireless communication device (e.g., UE 104 or 204) (305). The signaling may identify, include, or otherwise identify at least one transmission configuration indicator (TCI) state to be used in beam form recovery (BFR). The signaling may be referred to sometimes as a TCI state indication signaling. The TCI state may identify, define, or include various parameters specifying the performance of the BFR procedure. In some embodiments, the TCI state may define, identify, or be associated with at least one power control parameter.

In some embodiments, the signaling may identify or include a medium access control control element (MAC CE) activating the TCI state or a codepoint of at least one TCI state. In some embodiments, the signaling may identify or include a MAC CE activating more than one TCI state, or more than one codepoint of at least one TCI state. In some embodiments, the signaling may identify or include a downlink control information (DCI) (e.g., DCI of format 1_1 or 1_2). The DCI may lack or include a downlink assignment (DLA), a TCI field indicating the state or the codepoint of the TCI states. The wireless communication device may in turn retrieve, identify, or receive the signaling from the wireless communication node.

The wireless communication device may identify, determine a new beam for link recovery (310). The link recovery may be in accordance with a BFR procedure. The wireless communication device may determine to initiate the BFR procedure, when all of a reference signals (RSs) fail. Upon receipt or identification of the signaling, the wireless communication device may parse the signaling received from the wireless communication node to extract or identify the at least one TCI state or the code point of the at least one TCI state to be used in the BFR procedure.

In some embodiments, the wireless communication device may perform the BFR procedure in accordance with a first function or a second function. Under the first function (also referred as unified TCI scheme), the TCI state may be indicated for being applicable for more than one type of communication. Under the second function (also referred as enhanced BFR scheme), the new beam for link recovery may applicable for at least one of communication of a physical downlink control channel (PDCCH) except BFR-PDCCH and PDCCH monitoring on a control resource set (CORESET) #0, communication of a physical downlink shared channel (PDSCH) corresponding to PDCCH except BFR-PDCCH, communication of a physical uplink shared channel (PUSCH), communication of channel state information reference signal (CSI-RS), or communication of a sounding reference signal (SRS). The new beam may be applicable for performing a communication if at least one of the following conditions is met: when the first function or the second function are enabled (or the corresponding parameter is provided or absent) (i) by the wireless communication node; (ii) based on the capabilities of the wireless communication node.

The wireless communication device may identify, calculate, or otherwise determine a time for which the new beam is applicable (315). The wireless communication device may determine whether the new beam is applicable in accordance with one or more conditions. The conditions may identify or include: (i) a source reference signal (RS) of the new beam is a synchronization signal block (SSB); (ii) the source RS of the new beam is not included in a beam state set activated via medium access control control element (MAC CE) signaling; or (iii) the source RS of the new beam is not included in a beam state set configured via radio resource control (RRC) signaling, among others. When at least one of the conditions is satisfied, the wireless communication device may determine that the new beam is applicable. Otherwise, when none of the conditions are satisfied, the wireless communication device may determine that the new beam is not applicable.

In some embodiments, the wireless communication device may identify, calculate, or determine a starting time of the time for which the new beam is beam applicable. The starting time may identify, correspond to, or be X symbols after an BFR response. X may be an integer corresponding to a number of symbols (e.g., 28 symbols). In some embodiments, the wireless communication device may estimate, predict, or otherwise determine X number of symbols. In some embodiments, X may be determined in accordance with a smallest subcarrier spacing (SCS) of a group of component carriers (CCs) to which the new beam applies or the TCI for the first function. In some embodiments, X may be determined in accordance with a smallest SCS of a group of CCs to which the new beam applies and a CC where the BFR response is received.

In determining the starting time, the wireless communication device may estimate, predict, or otherwise determine the BFR response. In some embodiments, the BFR response may be determined in accordance with a physical downlink control channel (PDCCH) reception with a downlink control information (DCI) format with a cyclic redundancy check (CRC) scrambled by a cell radio network temporary identifier (C-RNTI) or modulation and coding scheme C-RNTI (MCS-C-RNTI) in a search space set provided by recovery-SearchSpaceId. In some embodiments, the BFR response may be determined in accordance with a PDCCH reception with a DCI format scheduling a physical uplink shared channel (PUSCH) transmission with a same hybrid automatic request (HARD) process number as for transmission of a first PUSCH and having a toggled new data indicator (NDI) field value, wherein the first PUSCH carries a BFR medium access control control element (MAC CE).

In some embodiments, the wireless communication device may identify, calculate, or determine an ending time for the time in which the new beam is applicable. In some embodiments, the wireless communication device may calculate or determine the ending time based on the signaling indicating the TCI state. The ending time may correspond to a time point after reception such as signaling or a period after reception of such signaling. With the determination the starting time and the ending time, the wireless communication device may determine the time in which the new beam is applicable. In some embodiments, the wireless communication device may determine the time as at least one of a start time or an end time (and/or a time duration) for which the new beam is applicable.

The wireless communication device may identify, calculate, or otherwise determine at least one power control parameter (320). The power control parameter may identify various specifications for uplink transmissions with the wireless communication node. The power control parameter may define, identify, or otherwise include an open-loop power control parameter, a pathloss reference signal (PL-RS), or a closed-loop power control parameter, among others. In some embodiments, the power control parameter comprises a power control parameter associated with the TCI state of: a source reference signal (SRS) of the new beam, or the new beam itself.

In some embodiments, the wireless communication device may determine the power control parameter for an uplink signal based on a power control parameter indication field in the TCI state or in a second signaling. In some embodiments, the wireless communication device may retrieve, identify, or otherwise receive the second signaling from the wireless communication node. The second signaling may be another DCI scheduling the uplink signal with the wireless communication node. In the second signaling, information about a power control parameter indication field may be determined by a number of open-loop power control parameters corresponding to the TCI state. The determination may be performed by the wireless communication node prior to transmission to the wireless communication device. In some embodiments, the power control parameter indication field may include, identify, or otherwise indicate both open loop power control parameter, and closed loop power control parameter.

The information may identify or include a bitsize of the power control parameter indication field in the second signaling. In some embodiments, the bitsize may be determined as:

$$\lceil \log_2(N_{OLPC}) \rceil$$

where $N_{OLPC}$ is the number of open-loop power control parameters corresponding to the TCI state. The information may also include or identify on the number of open-loop power control parameters corresponding to the TCI state. The number of open-loop power control parameters may identify or include at least one of: (i) a number of the at least one open-loop power control parameter associated with the TCI state; (ii) a maximum number of open-loop power control parameters associated with the TCI state within a configured set of TCI states (e.g., via radio resource control (RRC) signaling); or (iii) a maximum number of open-loop power control parameter associated with the TCI state within an activated set of TCI states (e.g., via MAC-CE), among others.

The wireless communication device may set, identify, or otherwise determine a transmission configuration (325). The configuration may be for an uplink transmissions (e.g., physical uplink shared channel (PUSCH) transmission) based on a sounding reference signal (SRS) resource when the TCI state is applicable. In some embodiments, the configuration may define, identify, or include a precoder or an uplink transmission spatial filter for the uplink signal. In some embodiments, the wireless communication device may determine the uplink transmission spatial filter for the SRS resource with the TCI state as a reference when the TCI state is applicable.

The wireless communication device may identify, generate, or otherwise determine an association for scheduling request (SRs) configurations (330). The wireless communication device may determine an association between N SR configurations and N sets of beam failure detecting RSs of a first serving cell. The determination may be based on whether the first serving cell belongs to a second serving cell or a number of detected beam failures for the second serving cell. N may be an integer value. The second serving cell may include at least one of: a special cell (SpCell), a serving cell of a SR configuration of the N SR configurations, or a serving cell of the N SR configurations, among others. In some embodiments, the N sets of beam failure detecting RSs sets may be of a serving cell. In some embodiments, the N sets of beam failure detecting RSs may be of one bandwidth part (BWP) of a serving cell.

In some embodiments, the wireless communication device may determine the association for the SR configurations depending on the beam failure in the serving cell. In some embodiments, when the second serving cell and the first serving cell are different serving cells, the wireless communication device may determine the association between the N SR configurations and the N sets of beam failure detecting RSs of the first serving cell, if no beam failure is detected for the second serving cell. In addition, the wireless communication device may determine a relationship between the beam failure detecting RSs and associated RSs. In some embodiments, the relationship between an index of a set of beam failure detecting RSs and an index of an associated SR for the first serving cell may be different from a relationship between the index of the set of beam failure detecting RSs and an index of the second serving cell.

In some embodiments, the wireless communication device may identify or determine whether an index of a set of beam failure detecting RSs and an index of an associated SR are same or different, depending on the serving cells. In some embodiments, the wireless communication device may determine that an index of a set of beam failure detecting RSs and an index of an associated SR are same when the first serving cell belongs to the second serving cell. The wireless communication device may further determine that the index of the set of beam failure detecting RSs set the index of the associated SR are different when the first serving cell does not belong to the second serving cell. In some embodiments, the wireless communication device may determine that an index of a set of beam failure detecting RSs and an index of an associated SR are different when the first serving cell belongs to the second serving cell. The wireless communication device may further determine that the index of the set of beam failure detecting RSs and the index of the associated SR are same when the first serving cell does not belong to the second serving cell.

In some embodiments, the wireless communication device may identify or select a SR configuration from the N SR configurations based on a number of detected beam failures in the serving cell. If a number of detected beam failures for the second serving cell is smaller than a number of sets of beam failure detecting RSs or candidate sets of RSs configured on the second serving cell, the wireless communication device may select the SR configuration from the N SR configurations. The selected SR configuration may be associated with a set of beam failure detecting RSs of a beam failure on the second serving cell. If no beam failure is detected on the second serving cell, the wireless communication device may select the SR configuration from the N SR configurations. The selected SR configuration may be associated with a set of beam failure detecting RSs of a detected beam failure on a secondary cell (SCell). If no beam failure is detected on the second serving cell, by the wireless communication device may select a SR configuration from the N SR configurations. The selected SR configuration may be associated with a plurality of SCells for which beam failure is detected in each of the SCells based on a set of beam failure detecting RSs associated with the selected SR configuration.

The wireless communication device may carry out or perform communications with the wireless communication node (335 and 335'). In performing, the wireless communication device may send or transmit the communications to the wireless communication node. The communications may be associated with BFR procedure in accordance with the new beam. In some embodiments, the wireless communication device may provide, send, or otherwise transmit a BFR request in accordance with the new beam to the wireless communication node. The wireless communication node may in turn retrieve, identify, or receive the BFR request from the wireless communication device. The wireless communication node may return, send, or otherwise transmit a BFR response responsive to the BFR request. Upon transmission of the BFR request, the wireless communication device may wait or monitor for the BFR response from the wireless communication node. The wireless communication device may detect the BFR response transmitted by the wireless communication node. The wireless communication device may apply the new beam for performing at least one target transmission in the time period after the BFR response.

In some embodiments, the communication may correspond to or include a beam failure recovery (BFR) physical downlink control channel (PDCCH) (BFR-PDCCH). For the BFR-PDCCH, the wireless communication device can be provided a CORESET through a link to a search space set provided by recoverySearchSpaceId, for monitoring PDCCH in the CORESET (e.g. for a primary cell (PCell) or a primary and second cell (PSCell)). The CORESET can be noted as BFR-CORESET. The search space set can be noted as BFR-SS. The PDCCH can be noted as BFR-PDCCH. BFR-PDCCH may also refer to a PDCCH monitoring in a search space set provided by recoverySearchSpaceId.

In some embodiments, the communication may include a PDCCH other than the BFR-PDCCH (also referred as PDCCH or a normal PDCCH). The communication may identify or include a non UE-dedicated PDCCH (e.g., PDCCH monitoring in a CORESET associated with the common search space set), or a UE-dedicated PDCCH (e.g., PDCCH monitoring in a CORESET associated with the UE-specific search space set), or both. In some embodiments, the communication may include a physical downlink shared channel (PDSCH). The communication may include a UE-dedicated PDSCH (e.g., as scheduled or activated by a DCI in a UE-dedicated PDCCH), a non UE-dedicated PDSCH (e.g., as scheduled or activated by a DCI in a non UE-dedicated PDCCH), or both. In some embodiments, the communication may include a physical uplink control channel (PUCCH). In some embodiments, the communication may include a physical uplink shared channel (PUSCH). In some embodiments, the communication may include a channel state information reference signal (CSI-RS) or a sounding reference signal (SRS), among others. The communication may include CSI-RS or SRS with an enable flag is provided or an disable flag is not provided for the first function or the second function, in RS resource level or RS resource set level.

In some embodiments, the communication between the wireless communication device and the wireless communication node may include a downlink communication. The downlink communication may be is provided a reference signal for quasi col-location (QCL) information for a demodulation reference signal (DM-RS) of a physical downlink shared channel (PDSCH) and a DM-RS of a physical downlink control channel (PDCCH), or a channel state information reference signal (CSI-RS), according to a transmission configuration indicator (TCI) state (e.g., for the downlink communication or by the TCI For both downlink and uplink communications), among others. In some embodiments, the communication between the wireless communication device and the wireless communication node may include an uplink communication. The uplink communication may be provided a reference signal for determining an uplink (UL) transmission (TX) spatial filter for dynamic-grant and configured-grant based physical uplink shared channel (PUSCH), or a sounding reference signal (SRS), according to the TCI state (e.g., for the uplink communication or by the TCI For both downlink and uplink communications), among others.

In some embodiments, the wireless communication device may identify, generate, or otherwise determine a reference signal based on the new beam. The reference signal may be for a physical downlink shared channel (PDSCH) or a physical uplink shared channel (PUSCH) corresponding to reception of downlink control information (DCI) during the time period for which the new beam is applicable for performing the communication. For fallback DCI (DCI format 0_0/0_1), beam of scheduled PUSCH or PDSCH and determined using the PDCCH or PUCCH respectively, which is already provided by the new beam.

For DCI format 1-1/1-2, any value of TCI field may correspond to the new beam, since no new MAC CE activation is available during the time of the new beam. In some embodiments, the reference signal for the PDSCH may be used to determine a reference signal or quasi co-location (QCL) information for a demodulation reference signal (DMRS) of the PDSCH. In some embodiments, the reference signal for the PUSCH may be used to determine a reference signal for determining an uplink (UL) transmission (TX) spatial filter of the PUSCH.

In some embodiments, the wireless communication device may provide, send, or transmit the uplink signal with the power determined in accordance with the power control parameter associated with the new beam. The uplink signal may include at least one of: a physical uplink shared channel (PUSCH), a physical uplink control channel (PUCCH), or a sounding reference signal (SRS), among others. The wireless communication device may also transmit the uplink signal in accordance with the determined configuration, such as the precoder or the uplink transmission spatial filter.

The wireless communication device may monitor the communications with the wireless communication node (340). In some embodiments, the wireless communication device may monitor a beam failure recovery physical downlink control channel (BFR-PDCCH). The monitoring may be until reception of a medium access control control element (MAC CE) activating at least one transmission configuration indicator (TCI) state, or a codepoint of at least one TCI state. In some embodiments, the wireless communication device may monitor the BFR-PDCCH until reception of a MAC CE activating more than one TCI state or more than one codepoint of at least one TCI state, and a downlink control information (DCI). The DCI may be of format 1_1 or 1_2, and may include or lack DLA (downlink assignment) or a TCI field which indicates a TCI state or a codepoint of TCI states.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

determining, by a wireless communication device, a new beam for link recovery, responsive to detecting beam failure;

determining, by the wireless communication device, an ending time of a time for which the new beam is applicable for performing a communication based on a signaling indicating at least one transmission configuration indicator (TCI) state; and monitoring, by the wireless communication device, during the time for which the new beam is applicable, a beam failure recovery physical downlink control channel (BFR-PDCCH) until reception of a downlink control information (DCI) of format 1_1 or 1_2 which indicates the TCI state after a medium access control control element (MAC CE) activating more than one TCI state or more than one codepoint of the at least one TCI state.

2. The method of claim 1, wherein the communication comprises at least one of:

a BRF-PDCCH, a PDCCH other than the BFR-PDCCH, a physical downlink shared channel (PDSCH), a physical uplink control channel (PUCCH), a physical uplink shared channel (PUSCH), a channel state information reference signal (CSI-RS) or a sounding reference signal (SRS).

3. The method of claim 1, wherein the communication comprises at least one of:

a downlink communication to which a TCI state is applied, where the TCI state is applicable to determine a reference signal for more than one of quasi co-location (QCL) information for a demodulation reference signal (DM-RS) of a physical downlink shared channel (PDSCH), a DM-RS of a PDCCH, or a channel state information reference signal (CSI-RS), or an uplink communication to which a TCI state is applied, where the TCI state is applicable to determine a reference signal for determining an uplink (UL) transmission (TX) spatial filter for more than one of configured-grant based physical uplink shared channel (PUSCH), dynamic-grant PUSCH, or a sounding reference signal (SRS).

4. The method of claim 1, wherein the new beam is applicable for performing the communication if at least one of following conditions is met:

a source reference signal (RS) of the new beam is a synchronization signal block (SSB), the source RS of the new beam is not included in or as a reference of a TCI state set activated via MAC CE signaling, or the source RS of the new beam is not included in or as a reference of a TCI state set configured via radio resource control (RRC) signaling.

5. The method of claim 1, wherein the signaling comprises at least one of:

a MAC CE activating one TCI state or one codepoint of at least one TCI state, a MAC CE activating more than one TCI state, or more than one codepoint of at least one TCI state, or a DCI of format 1_1 or 1_2.

6. The method of claim 1, comprising:

monitoring, by the wireless communication device, the BFR-PDCCH until reception of the MAC CE activating one TCI state, or one codepoint of the at least one TCI state, monitoring, by the wireless communication device, the BFR-PDCCH after a MAC CE activating more than one TCI state or more than one codepoint of the at least one TCI state is applicable.

7. The method of claim 1, comprising determining, by the wireless communication device, a starting time of the time as X symbols after a BFR response, wherein X is an integer value.

8. The method of claim 7, wherein the BFR response is determined according to one of:

a PDCCH reception with a DCI format with a cyclic redundancy check (CRC) scrambled by a cell radio network temporary identifier (C-RNTI) or modulation and coding scheme C-RNTI (MCS-C-RNTI) in a search space set provided by recoverySearchSpaceId;

a PDCCH reception that determines completion of a contention based random access procedure; or a PDCCH reception with a DCI format scheduling a physical uplink shared channel (PUSCH) transmission with a same hybrid automatic request (HARQ) process number as for transmission of a first PUSCH and having a toggled new data indicator (NDI) field value, wherein the first PUSCH carries a BFR MAC CE.

9. The method of claim 7, wherein X is determined according to one of:

a smallest subcarrier spacing (SCS) of a group of component carriers (CCs) to which the new beam applies, or a smallest SCS of a group of CCs to which the new beam applies and a CC where the BFR response is received.

10. The method of claim 1, comprising determining, by the wireless communication device based on the new beam, a reference signal for a physical downlink shared channel (PDSCH) or a physical uplink shared channel (PUSCH) corresponding to reception of DCI during a time period for which the new beam is applicable for performing the communication.

11. The method of claim 10, wherein the reference signal for the PDSCH or the PUSCH is used to determine:

a reference signal or quasi co-location (QCL) information for a demodulation reference signal (DMRS) of the PDSCH, or a reference signal for determining an uplink (UL) transmission (TX) spatial filter of the PUSCH.

12. The method of claim 1, comprising:

transmitting, by the wireless communication device, an uplink signal with a power determined according to at least one power control parameter associated with the new beam.

13. The method of claim 12, wherein the uplink signal comprises at least one of: a physical uplink shared channel (PUSCH), a physical uplink control channel (PUCCH), a physical random access channel (PRACH) or a sounding reference signal (SRS).

14. The method of claim 12, wherein the at least one power control parameter comprises at least one of: an open-loop power control parameter, a pathloss reference signal (PL-RS), or a closed-loop power control parameter.

15. The method of claim 12, wherein the at least one power control parameter comprises a power control parameter associated with a TCI state of: a source reference signal of the new beam, or the new beam.

16. A wireless communication device, comprising: at least one processor configured to:

determine a new beam for link recovery, responsive to detecting beam failure;

determine an ending time of a time for which the new beam is applicable for performing a communication based on a signaling indicating at least one transmission configuration indicator (TCI) state; and monitor, during the time for which the new beam is applicable, a beam failure recovery physical downlink control channel (BFR-PDCCH) until reception of a downlink control information (DCI) of format 1_1 or 1_2 which indicates the at least one TCI state after a media access control control element (MAC CE) activating more than one TCI state or more than one codepoint of the at least one TCI state.

17. The wireless communication device of claim 16, wherein the communication comprises at least one of:

the BFR-PDCCH, a PDCCH other than the BFR-PDCCH, a physical downlink shared channel (PDSCH), a physical uplink control channel (PUCCH), a physical uplink shared channel (PUSCH), a channel state information reference signal (CSI-RS) or a sounding reference signal (SRS).

18. The wireless communication device of claim 16, wherein the communication comprises at least one of:

a downlink communication to which a TCI state is applied, where the TCI state is applicable to determine a reference signal for more than one of quasi co-location (QCL) information for a demodulation reference signal (DM-RS) of a physical downlink shared channel (PDSCH), a DM-RS of a PDCCH, or a channel state information reference signal (CSI-RS), or an uplink communication to which a TCI state is applied, where the TCI state is applicable to determine a reference signal for determining an uplink (UL) transmission (TX) spatial filter for more than one of configured-grant based physical uplink shared channel (PUSCH), dynamic-grant PUSCH, or a sounding reference signal (SRS).

19. The wireless communication device of claim 16, wherein the new beam is applicable for performing the communication if at least one of following conditions is met:

a source reference signal (RS) of the new beam is a synchronization signal block (SSB), the source RS of the new beam is not included in or as a reference of a TCI state set activated via MAC CE signaling, or the source RS of the new beam is not included in or as a reference of a TCI state set configured via radio resource control (RRC) signaling.

* * * * *